(12) United States Patent
    Dableh

(10) Patent No.: US 11,089,666 B1
(45) Date of Patent: Aug. 10, 2021

(54) ROOM TYPE DETERMINATIONS WITH MOTION SENSORS

(71) Applicant: JDRF Electromag Engineering Inc., Mississauga (CA)

(72) Inventor: Roumanos Dableh, Oakville (CA)

(73) Assignee: JDRF ELECTROMAG ENGINEERING INC., Mississauga (CA)

( * ) Notice: Subject to any disclaimer, the term of this patent is extended or adjusted under 35 U.S.C. 154(b) by 0 days.

(21) Appl. No.: 16/786,769

(22) Filed: Feb. 10, 2020

(51) Int. Cl.
    H05B 47/10     (2020.01)
    H05B 47/125    (2020.01)
    H05B 47/13     (2020.01)
    H05B 47/11     (2020.01)

(52) U.S. Cl.
    CPC ........... *H05B 47/125* (2020.01); *H05B 47/11* (2020.01); *H05B 47/13* (2020.01)

(58) Field of Classification Search
    CPC .. H05B 47/105; H05B 47/115; H05B 47/125; H05B 47/135; H05B 47/175
    See application file for complete search history.

(56) References Cited

U.S. PATENT DOCUMENTS

| 7,619,366 B2 * | 11/2009 | Diederiks | H05B 47/125 315/149 |
| 10,595,379 B2 * | 3/2020 | Magielse | H05B 47/125 |

| 2011/0057581 A1 | 3/2011 | Ashar et al. | |
| 2012/0086568 A1 | 4/2012 | Scott et al. | |
| 2017/0055126 A1 * | 2/2017 | O'Keeffe | H04W 4/023 |
| 2017/0300973 A1 | 10/2017 | Jones et al. | |
| 2018/0242426 A1 * | 8/2018 | Trickler | H05B 47/175 |

OTHER PUBLICATIONS

Alzantot et al., "CrowdInside: Automatic Construction of Indoor Floorplans", Proceedings of the 20th International Conference on Advances on Geographic Information Systems, ACM, 2 Penn Plaza, Suite 701, New York, NY 10121-0701 USA, Nov. 6, 2012, pp. 99-108, XP058010905 https://arxiv.org/pdf/1209.3794.pdf.

* cited by examiner

*Primary Examiner* — Tung X Le
(74) *Attorney, Agent, or Firm* — DLA Piper LLP (US)

(57) ABSTRACT

An example of an apparatus to determine a room type is provided. The apparatus includes a sensor to detect a motion event in a space. In addition, the apparatus includes a memory storage unit to store data associated with the motion event. Furthermore, the apparatus includes a communications interface to communicate with an external device. The communications interface is to transmit the local dataset to the external device and to receive an external dataset from the external device to be stored in the memory storage unit. The apparatus also includes an aggregator in communication with the memory storage unit to combine the local dataset with the external dataset to generate a motion signature. The apparatus further includes a matching engine to select a room type based on the motion signature.

19 Claims, 8 Drawing Sheets

ROOM TYPE DETERMINATIONS WITH MOTION SENSORS

BACKGROUND

Buildings typically have rooms which may be used for varying purposes. For example, some rooms may be used as a general meeting room where several individuals may congregate to facilitate communication, such as for a meeting. As another example, some rooms may be used as a private office which may be assigned to one individual at a time, where the individual may have privacy to improve concentration. Other types of rooms may include break rooms, lunch rooms, washrooms, libraries, mechanical rooms, etc. The type of room may be categorized and assigned by a person who sets up a space for use, such as an interior designer. The person may assign boundaries to generate a floorplan or an internal map of the building as well as change the layout over time as the used of the space evolves, such as when an organization using the space grows.

BRIEF DESCRIPTION OF THE DRAWINGS

Reference will now be made, by way of example only, to the accompanying drawings in which:

Figure 1:
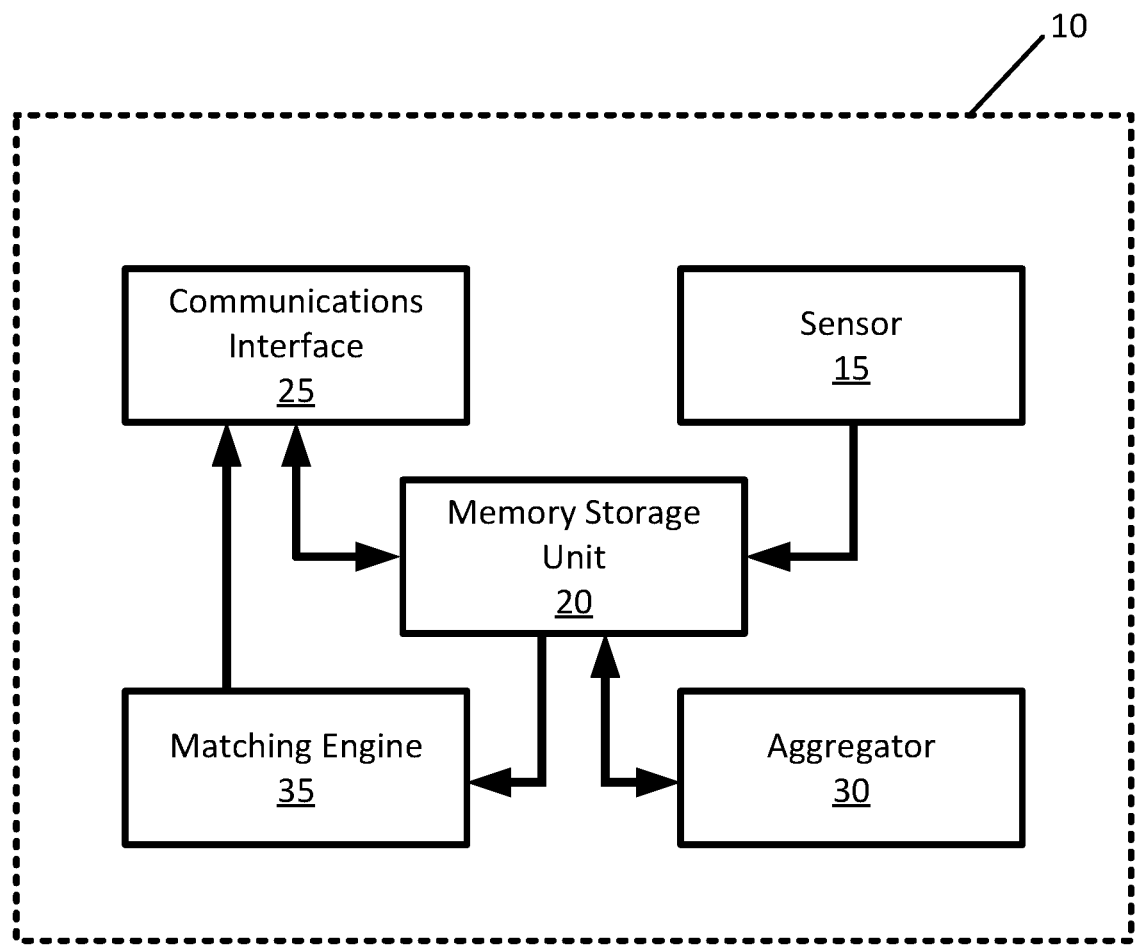
Figure 2:
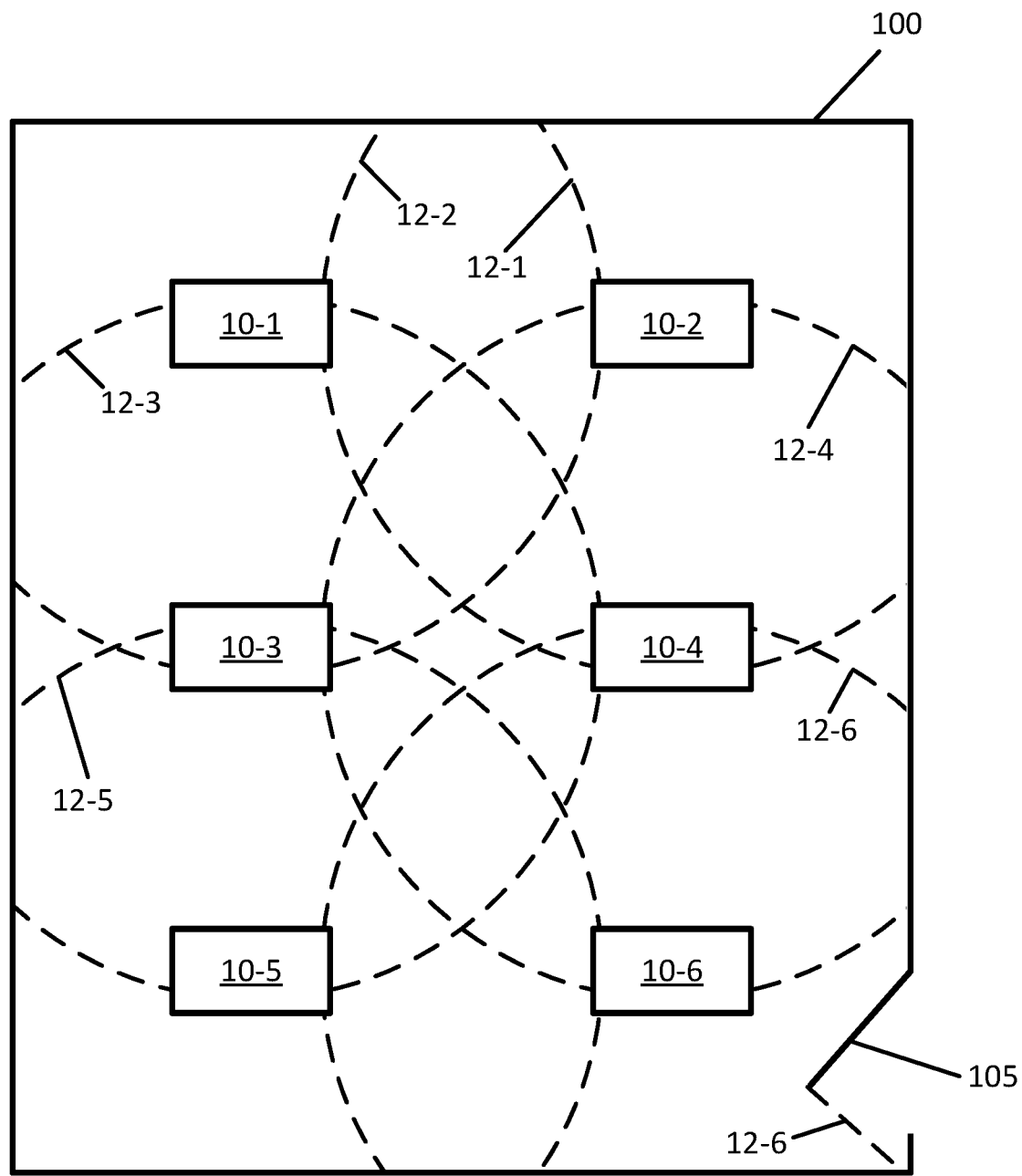
Figure 3A:
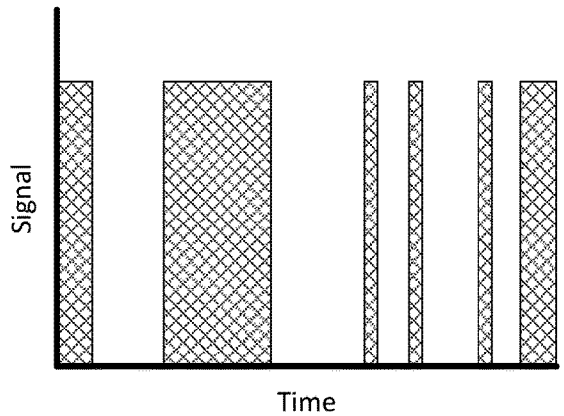
Figure 3B:
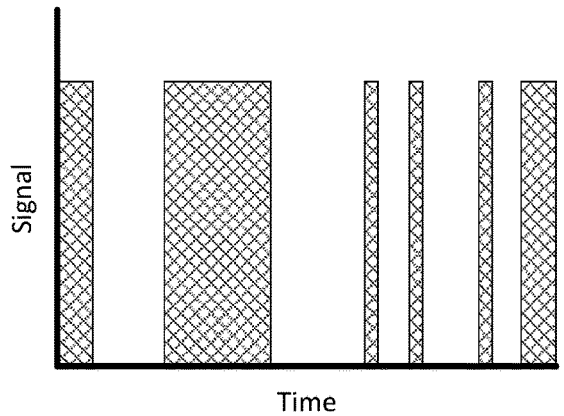
Figure 3C:
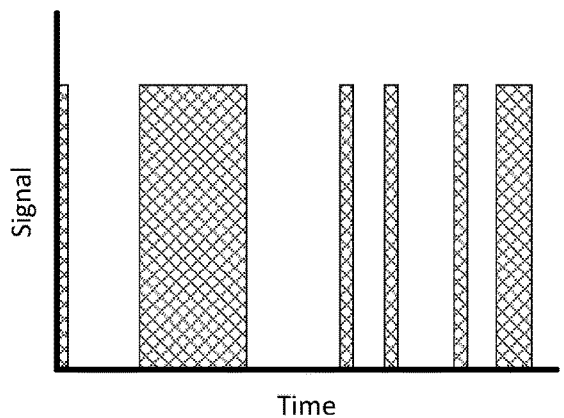
Figure 3D:
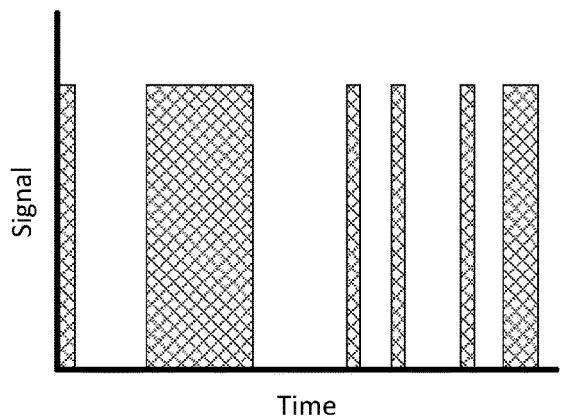
Figure 3E:
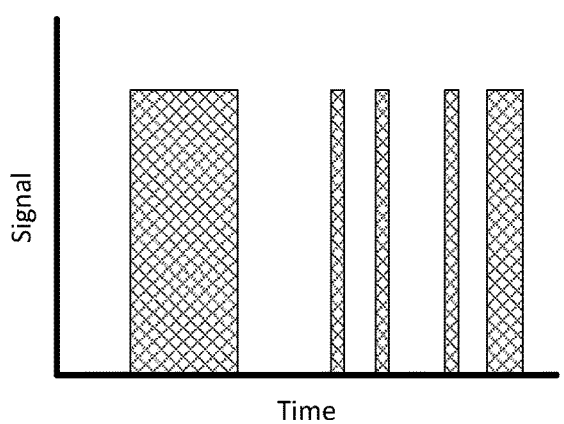
Figure 3F:
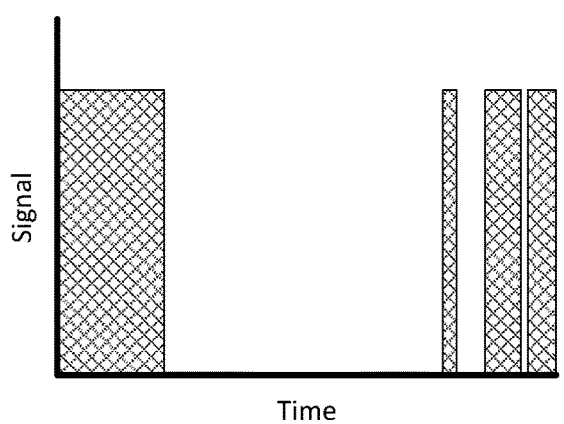
Figure 4:
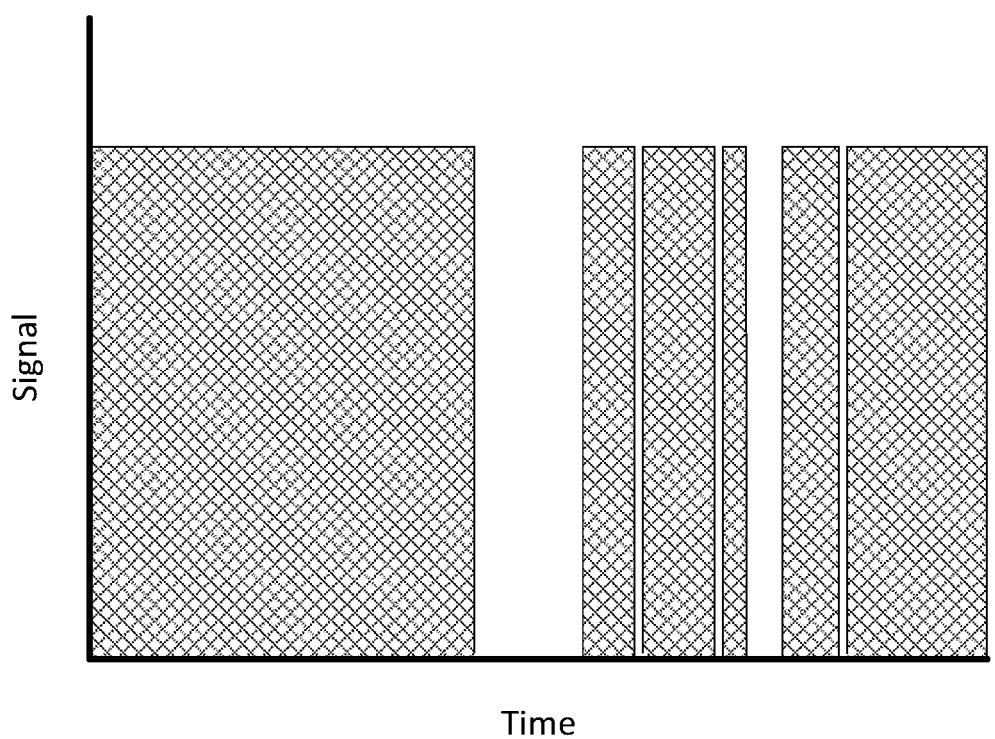
Figure 5:
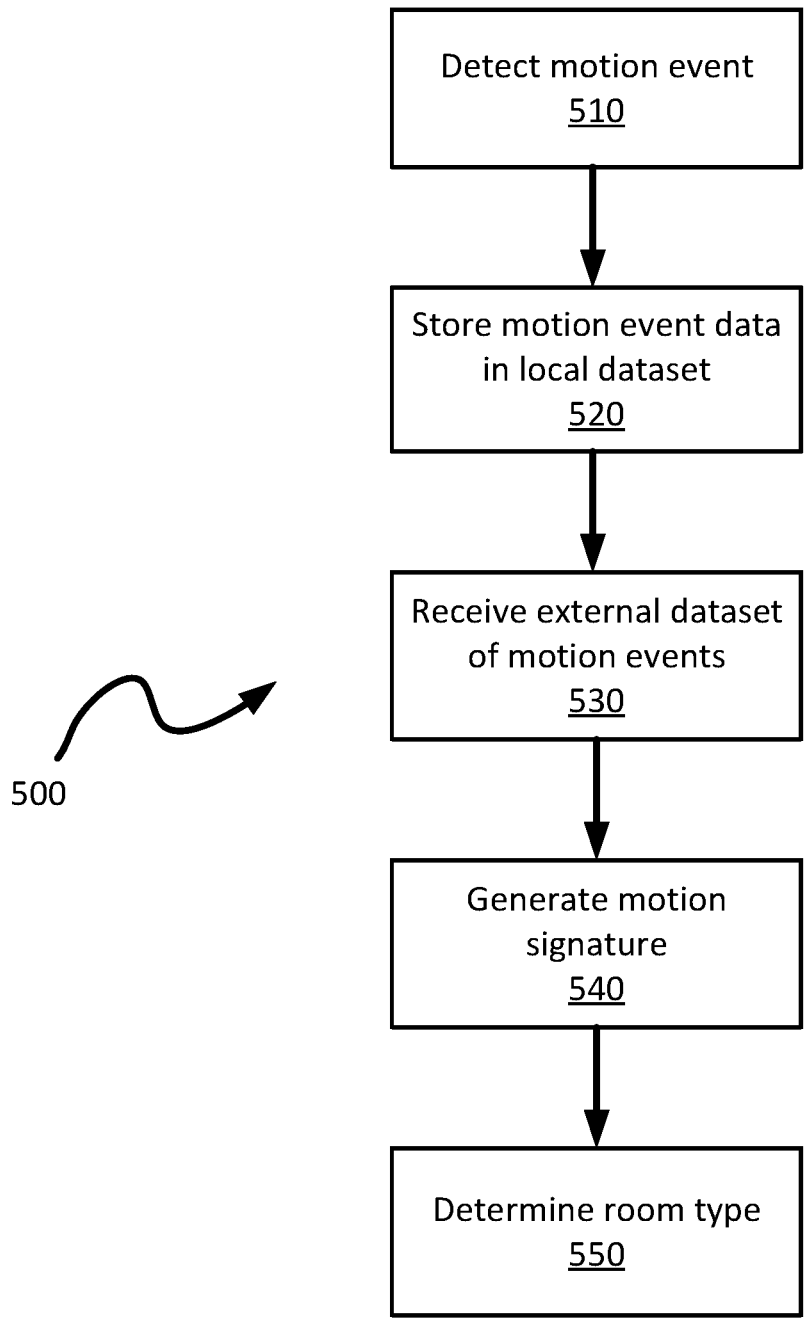
Figure 6:
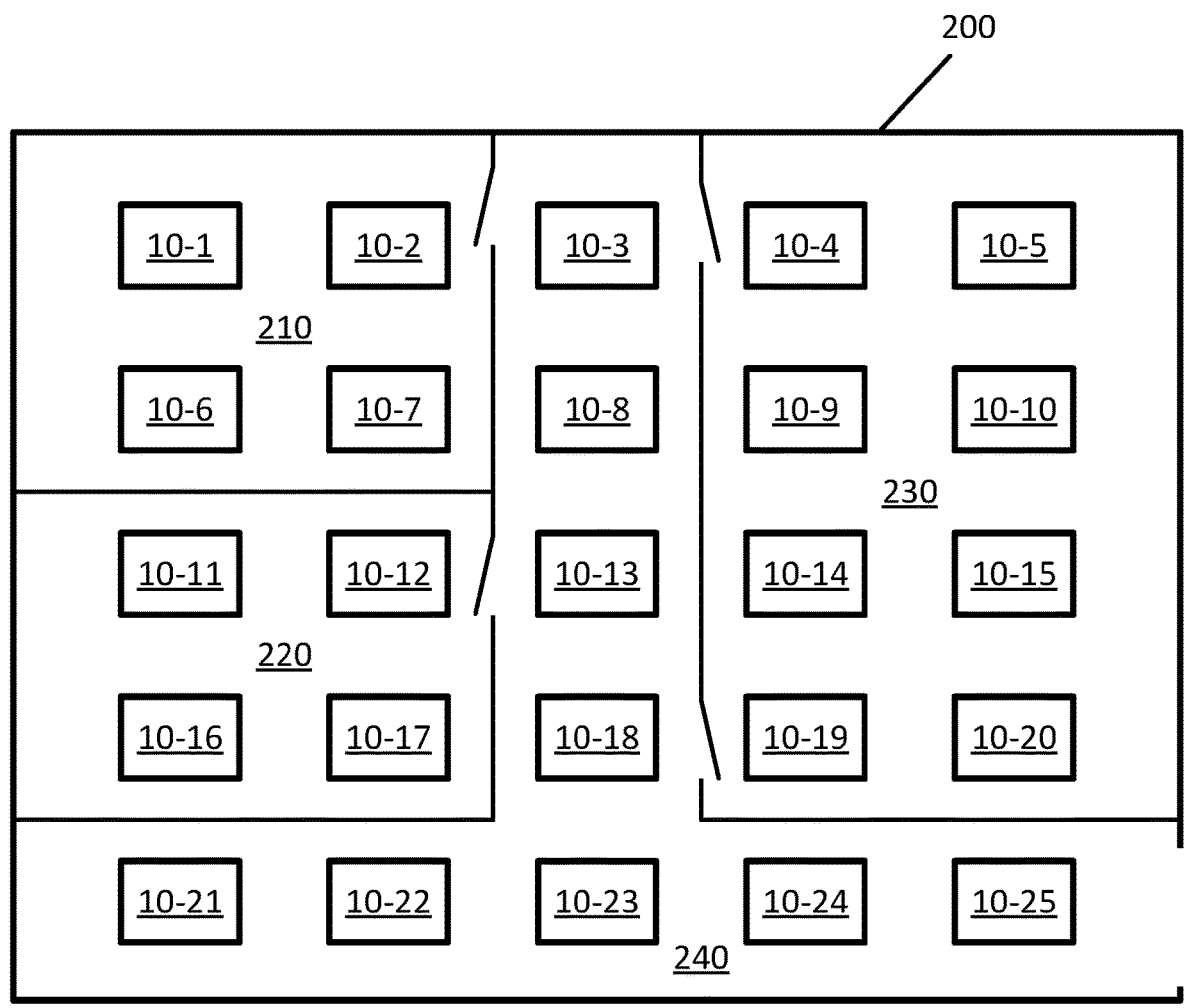
Figure 7:
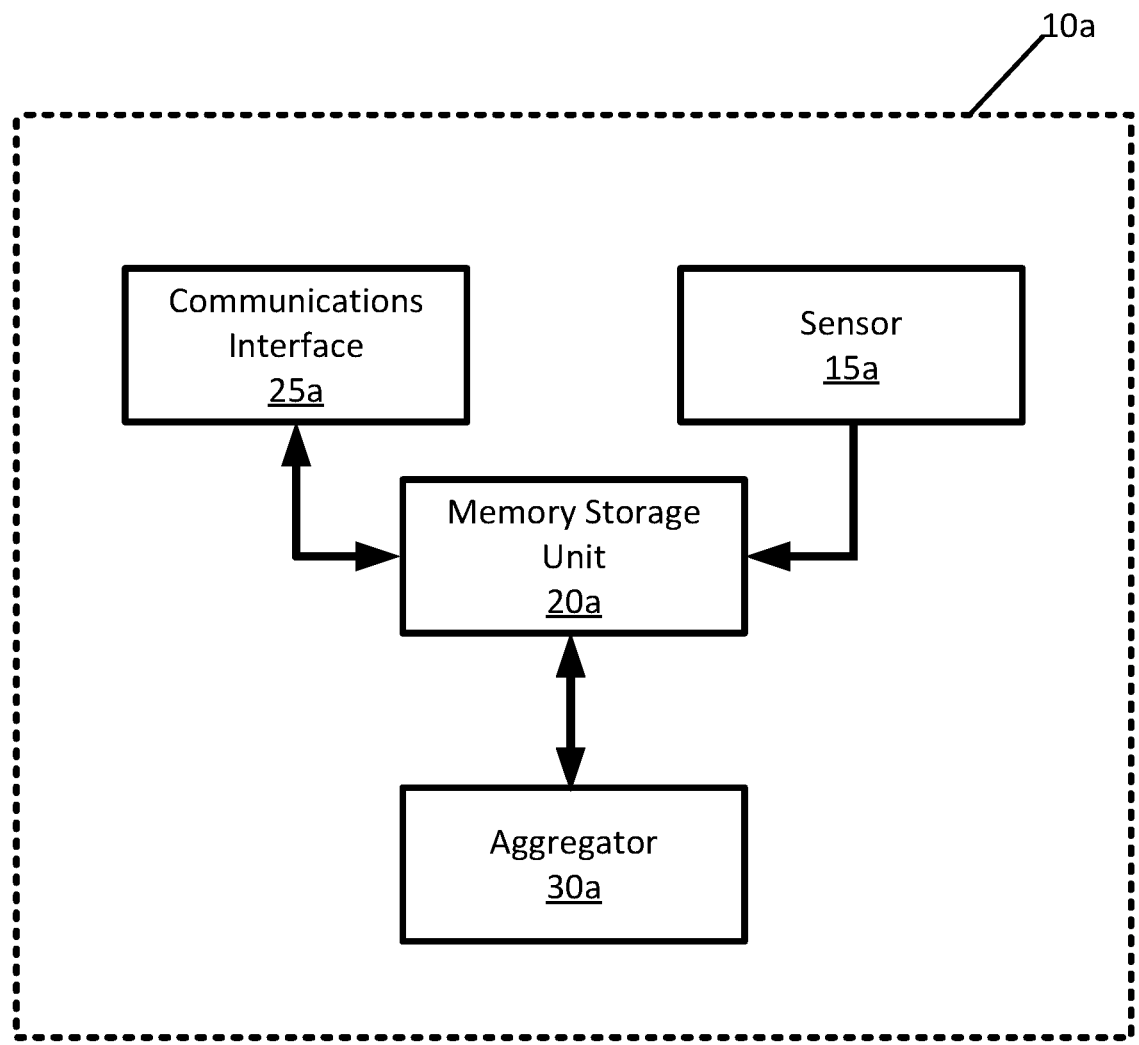
Figure 8:
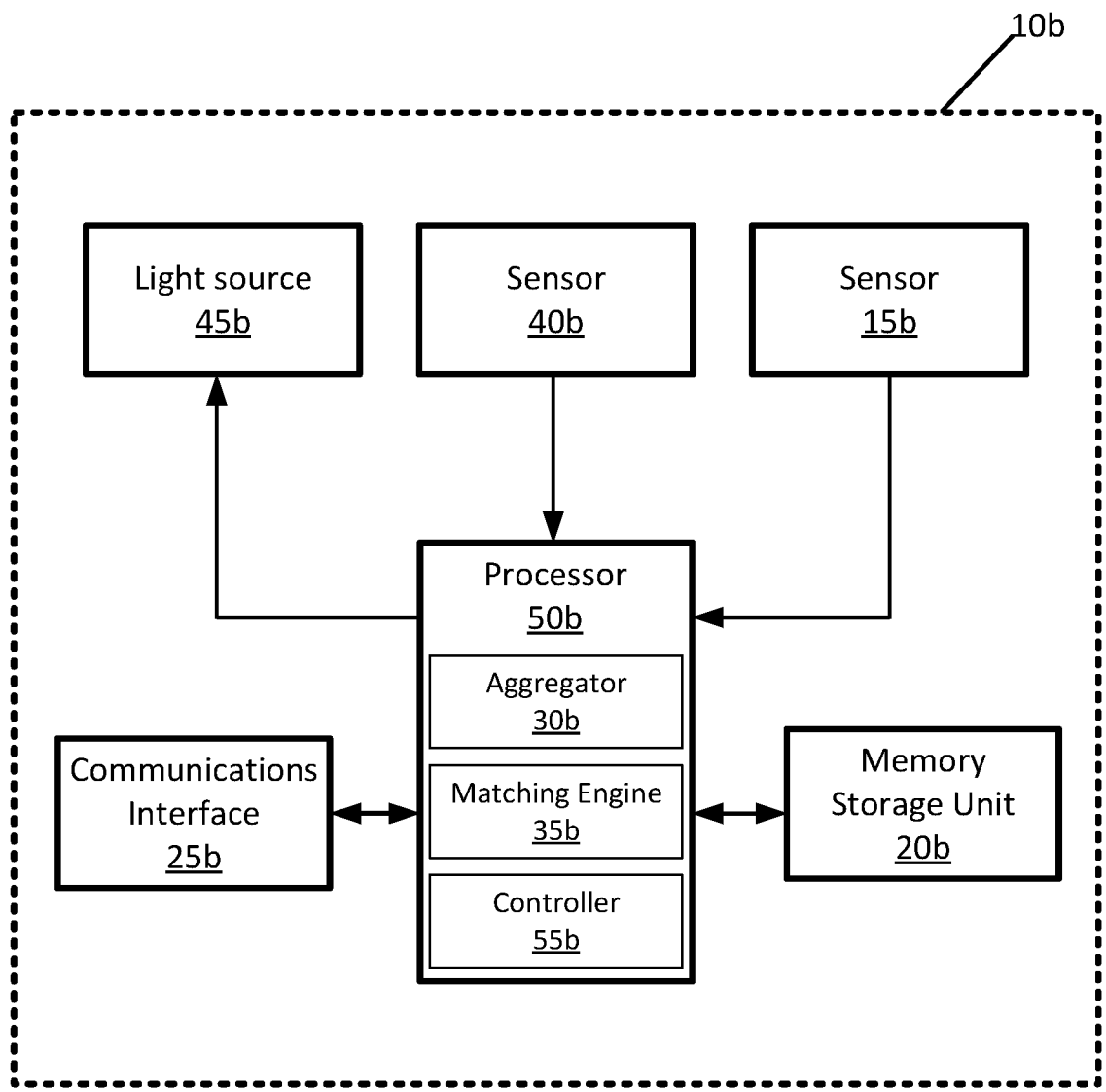

| | |
|---|---|
| FIG. 1 | is a schematic representation of the components of an apparatus to determine a room type; |
| FIG. 2 | is a schematic representation of a room where a system of a plurality of apparatus are deployed to determine a room type; |
| FIG. 3A | is graph of the dataset representing motion events as a function of time collected by an apparatus shown in FIG. 2; |
| FIG. 3B | is graph of the dataset representing motion events as a function of time collected by another apparatus shown in FIG. 2; |
| FIG. 3C | is graph of the dataset representing motion events as a function of time collected by another apparatus shown in FIG. 2; |
| FIG. 3D | is graph of the dataset representing motion events as a function of time collected by another apparatus shown in FIG. 2; |
| FIG. 3E | is graph of the dataset representing motion events as a function of time collected by another apparatus shown in FIG. 2; |
| FIG. 3F | is graph of the dataset representing motion events as a function of time collected by another apparatus shown in FIG. 2; |
| FIG. 4 | is graph of a motion signature generated from the datasets should in FIGS. 3A, 3B, 3C, 3D, 3E, and 3F; |
| FIG. 5 | is a flowchart of an example of a method of determining a room type; |
| FIG. 6 | is a schematic representation of a building space where a system of a plurality of apparatus are deployed to determine room types; |
| FIG. 7 | is a schematic representation of the components of another apparatus to determine a room type; and |
| FIG. 8 | is a schematic representation of the components of another apparatus to determine a room type. |

DETAILED DESCRIPTION

The room type may be based on the general types of activities carried out in the space. For example, a meeting room may be used by a large number of people who congregate for discrete periods of time throughout the day and may be left empty when no meetings are occurring. On the other hand, a private office may be used by an individual who may stay in the room for a large amount of time and who may also step out of the room for short periods of time to carry out other tasks within the building. Other types of rooms may include open work areas, classrooms, kitchens, and washrooms.

Once the room type has been identified, it is to be appreciated that the management of various services or settings within the room may be automated and/or customized based on the room type identified from sensor data. The services or settings that may be customized is not particularly limited and may include lighting, climate controls, door operations, blinds, etc. In a specific example, selecting operating parameters for a lighting control system may be carried out by applying different settings based on the room type in which a lighting fixture is installed. This allows a user or administrator to control the lights for each room type which may improve comfort and energy efficiency. Operating parameters for lighting control systems may include various device settings such as motion sensor timer values, the number and duration of transition levels between occupied and vacant light levels, dimming rates and the range of light levels. It is to be appreciated that each room may have multiple operating parameters for different uses. For example, a meeting room may have a set of operating parameters for a projector presentation where the lights are dim and a second set of operating parameters for meeting where the lights are brighter. Profiles for a room type may be used to define general operating parameters and rules and how lighting fixtures may respond to various events such as receiving a control signal from a control panel, detection of motion by a motion sensor, and a change in the ambient light level measured by a light sensors.

To automate the determination of a room type such that the operating parameters may be set without user or administrator intervention, a system to detect a room type based on sensor data is provided. In an example, the system may include a plurality of devices or apparatus having motion sensors to measure movement data within a room. The movement data collected from multiple sensors interconnected by a network connection may then be used to determine a room type. Upon determination of the room type, preset operating parameters associated with the room type may be applied to control various room settings, such as lighting settings or temperature settings.

Referring to FIG. 1, a schematic representation of an apparatus to determine a room type in coordination with other devices is generally shown at 10. The apparatus 10 may include additional components, such as various additional interfaces and/or input/output devices such as indicators to interact with a user of the apparatus 10. The interactions may include viewing the operational status of the control system, updating parameters of the control system, or resetting the apparatus 10. In the present example, the apparatus 10 is to collect data and to transmit the data to other devices and to receive data from other devices. The data from other devices may be used in combination with the collected data to make a room type determination. In the present example, the apparatus 10 includes a sensor 15, a memory storage unit 20, a communications interface 25, an aggregator 30, and a matching engine 35.

The sensor 15 is to detect a motion event in a space. In the present example, the sensor 15 may be a motion detector designed to identify motion events in a space. The space is not particularly limited and may be any space within the range of the sensor 15. The range of the sensor 15 may be dependent on the environment and obstacles within the environment. For example, the sensor 15 may have a range of about 3 meters if not blocked by an opaque obstacle. In other examples, the sensor 15 may have a longer range, such as about 7 meters, or shorter ranges, such as about 3 meters.

The positioning of the sensor 15 within a room is not particularly limited and the sensor 15 may be placed in a location such that it may detect motion events within a space. For example, if the space is a portion of a room, the sensor 15 may be placed in a location that may increase the amount of space covered by the sensor 15. It is to be appreciated by a person of skill in the art with the benefit of this description that the sensor 15 may use a line of sight to the motion event in order to detect the motion event. Accordingly, obstacles such as furniture, equipment, and walls may obstruct the sensor 15 from detecting a motion event on the other side. The sensor 15 may be mounted high in the space where fewer obstacles may be present since most obstacles, such as furniture and equipment, are may be close to the floor. For example, the sensor 15 may be mounted high on a wall or in the ceiling or in a lighting unit specifically designed for fixture mount sensors.

The sensor 15 may use a variety of methods to detect motion events in the space. In some examples, the sensor 15 may include an infrared detector to detect heat changes in the space which may indicate a motion event within the space by a person or other heat source. By using the passive infrared detector, the sensor 15 may be more sensitive to people and less sensitive to other motion events in the space, such as various equipment that may be automated. In other examples, the sensor 15 may be an active device where an emitter transmits a signal such that a reflection of the signal may be detected by a detector within the sensor 15. For example, the sensor 15 may include a microwave emitter and a motion event may be detected by measuring changes in the signals received at a detector capable of measuring phase shifts caused by moving objects. In other examples, electromagnetic signals of other wavelengths or acoustic signals may be used to detect motion events. In another example, the sensor 15 may be a camera or other image capturing device where a motion event may be detected using image processing techniques.

It is to be appreciated that the selection of the type of signal to be used may provide selective detection of motion events from different objects types of objects if the materials of the objects have different permeability to the signals. For example, objects made from materials that reflect the electromagnetic signals emitted by the sensor 15 may be detected if the object is moved; however, if the object is substantially transparent to the electromagnetic signal, motion events by the object will not be detected. In further examples, the sensor 15 may use more than one method to improve accuracy. In such examples, the sensor 15 may verify the detection by comparing all methods of detection to detect a motion event which will result in the reduction of false detections caused by motion events that do not represent a person in the room.

The memory storage unit 20 is to store data from motion events detected by the sensor 15. In particular, the memory storage unit 20 may store a plurality of motion events detected by the sensor in a local dataset. The local dataset of motion events is not particularly limited and each motion event may include additional information such as a time signature or an identifier to identify the sensor 15 that detected the motion event. In the present example, the memory storage unit 20 may be in communication with the sensor 15 where the sensor 15 may include processing capabilities to read and write to the memory storage unit 20. In other examples, a separate processor (not shown) may be used to control the sensor 15 and act as in intermediary for communications between the sensor 15 and the memory storage unit 20.

The memory storage unit 20 may be also used to store addition data to be used by the apparatus 10. For example, the memory storage unit 20 may store a plurality of reference signatures, each associated with a predetermined room type, to be used in make a room type determination as discussed in greater detail below. It is to be appreciated that the local dataset and the plurality of room signatures may be stored in separate databases on the same physical computer readable medium, or may be stored on one or more external servers, such as in a central server or a cloud server.

In the present example, the memory storage unit 20 is not particularly limited and may include a non-transitory machine-readable storage medium that may be any electronic, magnetic, optical, or other physical storage device. The memory storage unit 20 may be used to store information such as datasets received from external devices via the communications interface 25, the motion signature generated by the aggregator 30, or results of the room type determination from the matching engine 35. In addition, the memory storage unit 20 may be used to store instructions for general operation of the apparatus 10. In particular, the memory storage unit 20 may store an operating system that is executable by a processor to provide general functionality to the apparatus 10, for example, functionality to support various applications. The memory storage unit 20 may additionally store instructions to operate the aggregator 30 and the matching engine 35. Furthermore, the memory storage unit 20 may also store control instructions to operate other components and peripheral devices of the apparatus 10, such additional sensors, cameras, user interfaces, and light sources.

The memory storage unit 20 may be preloaded with data, such as room signatures or instructions to operate components of the apparatus 10. In other examples, the instructions may be loaded via the communications interface 25 or by directly transferring the instructions from a portable memory storage device connected to the apparatus 10, such as a memory flash drive. In other examples, the memory storage unit 20 may be an external unit such as an external hard drive, or a cloud service providing content.

The communications interface 25 is to communicate with an external device. In the present example, the communications interface 25 communicates with external devices over a network, which may be a public network shared with a large number of connected devices, such as a WiFi network or cellular network. In other examples, the communications interface 25 may be to communicate over a private network. In particular, the communications interface 25 is to transmit the local dataset stored on the memory storage unit 20 to an external device. The manner by which the local dataset is transmitted to an external device is not particularly limited. For example, the local dataset may be transmitted periodically by the communications interface 25 by broadcasting the local dataset to all devices. In other examples, the local dataset may be transmitted to a specific external device upon receiving a request from the external device.

Furthermore, the communications interface 25 is to receive an external dataset from an external device. The manner by which the dataset is received may be similar to the manner by which the local dataset is transmitted via the communications interface 25 discussed above. The communications interface 25 may write the external dataset to the memory storage unit 20 either directly or indirectly via a processor. It is to be appreciated by a person of skill with the benefit of this description that the communications interface 25 is not limited to receiving an external dataset from a single external device. Instead, the communications interface 25 may receive a plurality of external datasets from multiple external devices. Each external dataset received may also include an identifier associated with the specific external device from which the external dataset is received. The external devices are also not limited and may include a plurality of devices similar to the apparatus 10 distributed within a room. Accordingly, the apparatus 10 and external devices may cooperated to cover a room or larger area and provide a motion signature for the room by sharing datasets with each other when the apparatus 10 cannot cover the entire room.

The manner by which the communications interface 25 transmits and receives the data is not limited and may include receiving an electrical signal via a wired connection with other external devices or a central server. Since the apparatus 10 is may be mounted at a stationary location, using a wired connection between the apparatus and the external device may provide a robust connection. In other examples, the communications interface 25 may connect to other devices wirelessly via the Internet. In further examples, the communications interface 25 may be a wireless interface to transmit and receive wireless signals such as via a WiFi network or directly to the external device. As another example, the communications interface 25 may connect to another proximate device via a Bluetooth connection, radio signals or infrared signals and subsequently relayed to additional devices. Although a wireless connection may be more susceptible to interference, the installation process of the apparatus 10 and associated external devices is simplified.

The aggregator 30 is in communication with the memory storage unit 20 and is to combine the local dataset with an external dataset to generate a motion signature. It is to be appreciated that number of datasets the aggregator 30 may combine is not limited. In the present example, the communications interface 25 may receive an external dataset from all devices in the same room as the apparatus 10. Accordingly, the aggregator 30 may in turn aggregate the all the datasets to generate the motion signature of the room. It is to be appreciated by a person skilled in the art with the benefit of this description that if the external devices are similar or substantially identical to the apparatus 10, each external device may aggregate the datasets in a similar manner to arrive at the same motion signature for the room.

The manner by which the aggregator 30 combines the datasets is not particularly limited. In the present example, the local dataset and external datasets may have an identical data structure. In particular, the local dataset may record a binary value representing whether a motion event has been detected within range of the sensor 15 as a function of time. Similarly, each external device may obtain a similar dataset where sensors associated with each external device records the presence of a motion event as a function of time. In the present example, the motion signature of a room is the combination of times when the apparatus 10 and external devices detect motion events. In other examples, the motion signature may be the logical or binary sum of the values of the motion events detected by the apparatus 10 and external devices such that positional information within a room may be averaged over time. It is to be appreciated that this feature extraction process to generate the motion signature is not particularly limited. For example, the feature extraction process may determine the logical sum of dataset values over short time period such as a few minutes, the time elapsed between successive motion events and the number of motion events in a room within a given time period, the repeatability of a given feature over a long and cyclical time period, such as a day.

The matching engine 35 is to select a room type based the motion signature generated by the aggregator 30. The manner by which the matching engine makes the selection is not limited. In the present example, the matching engine 35 may be in communication with the memory storage unit 20 where a plurality of reference signatures of different predetermined room types may be stored. The matching engine 35 may compare the motion signature generated by the aggregator 30 with the reference signatures of different predetermined room types to select the room type based on the comparison. The reference signatures of each predetermined room type is not particularly limited and may be obtained by measuring actual data of the room type. The reference signatures may be standardized or associated with a specific layout of apparatus 10 in a room. In addition, there is no limitation on the number of room types. Some examples of room types include offices, conference rooms, open work areas, hallways, classrooms, kitchens, washrooms, libraries, and storage rooms. It is to be appreciated that each of these room types may be sub-classified into multiple room types. For example, offices may be classified into different predetermined room types, such as shared office or private office. In some examples, the reference signature of each predetermined room type may be theoretically calculated based on the different actions that are carried out in each room.

The comparison process carried out by the matching engine 35 may use various methods. For example, the matching engine 35 may compare each reference signature with the motion signature to assign a similarity index. The similarity index is not limited and may be the amount of time within a predetermined window where motion signature matches a reference signature. In other examples, the similarity index may be be determined from a comparison of the various features in the motion signature and a known set of features for each room type. The value of features that describe each room type may then be learned using offline training methods. For example, classification models may be trained with data offline can and deployed to an embedded target to make decisions at run time. Once the similarity index between each reference signature and the motion signature generated by the aggregator 30 is assigned or calculated, the room type associated with the reference signature having the greatest similarity index value may be selected by the matching engine 35.

In some further examples, the matching engine 35 may also carry out error checking functionality. For example, the matching engine 35 may compare the similarity index of the reference signature having the greatest value against a predetermined threshold. In cases where the greatest similarity index is below the predetermined threshold, the matching engine 35 may return an error and conclude that the motion signature does not match any known room type. It is to be appreciated by a person of skill with the benefit of this description that the predetermined threshold is not limited and may be set based on the application and empirical data. In some examples, the predetermined threshold may not be used whatsoever such that the matching engine 35 is to select the best match regardless.

Although the reference signatures are stored locally on the memory storage unit in the present example, it is to be appreciated that in other examples, the reference signatures of the predetermined room types may be stored remotely. The location of the reference signatures is not limited and may be stored on a central server or in the cloud to be accessed by the matching engine 35 via the communications interface 25. By storing the reference signatures remotely, such as at a central location, an administrator may update the reference signatures over time to improve accuracy or if normal use of each room type changes over time due to shifting trends within an organization. For example, an increased use of telecommunication systems between offices due to an expanding organization that increases the physical distances between members of the organization may result in less movement in private offices as people are less likely to walk to a colleagues office. Accordingly, such shifts may change the motion signature of a private office room type and may call for an update to the reference signature for the room type to maintain accuracy.

In further examples, the matching engine 35 may use a machine learning engine to classify the motion signature generated by the aggregator 30 to determine a room type. The model used by the machine learning engine is not limited and may include using various models. For example, the matching engine 35 may use a trained logistic regression classifiers to compare the signature with known signature types. Other examples of machine learning models may include convolutional neural networks, naïve Bayes, support vector machines, decision tree learning, and other multi-class classifiers that are well suited for determining decision boundaries for clustered data.

Once the room type has been determined by the matching engine 35, the room type may be transmitted via the communications interface 25 to a central server (not shown) managing the lighting controls in some examples. The central server may also receive the room type determinations from other devices such that it may verify the determination. As discussed above, since the apparatus 10 and the external devices within the same room share the same datasets, the room type determined by each device is to match. In other examples, the room type may be transmitted to other external devices where the verification is to be carried out in a decentralized manner. In this example, the apparatus 10 may unilaterally adjust its own parameters based on its own determination of room type.

By determining the room type, it is to be appreciated by a person of skill with the benefit of this description that a set of operating parameters may be implemented for the room to improve energy efficiency and comfort. For example, a private office may not have much movement and a person occupying the office may leave the office for short periods of time, such as to visit a colleague, pick up a job from a printer, or go to the washroom. Accordingly, an absence of motion may not mean that the office will be vacant for long and a longer time is to elapse before dimming lights in the room to avoid excessive toggling of the lights. In contrast, a conference room may be booked for discrete meeting throughout the day. Accordingly, once all parties vacate the meeting room, it is likely that the meeting has concluded and the lights may be dimmed after a short period of time has elapsed.

Referring to FIG. 2, a room 100 with a plurality of apparatus 10-1, 10-2, 10-3, 10-4, 10-5, 10-6 (generically, these apparatus are referred to herein as "apparatus 10" and collectively they are referred to as "apparatus 10", this nomenclature is used elsewhere in this description) deployed in operation is shown. In the present example, each of the apparatus 10 are substantially identical units and operate together as a system to make room type determination that collectively or individually. Once the room type is determined, the operating parameters of the apparatus 10 may be set or updated. The apparatus 10 are generally spaced uniformly throughout the room 100 and the range of each apparatus 10 overlaps with the adjacent apparatus 10 such that no area in the room 100 is not covered by an apparatus. In the present example, each of the apparatus 10-1, 10-2, 10-3, 10-4, 10-5, 10-6 includes a detection limit 12-1, 12-2, 12-3, 12-4, 12-5, 12-6 (generically, these detection limits are referred to herein as "detection limit 12" and collectively they are referred to as "detection limits 12", this nomenclature is used elsewhere in this description) within which the apparatus 10 may detect a motion event. In some examples, the detection limit 12 may not completely overlap such that there are blind spots within the room where the apparatus cannot detect motion events. However, if the blind spots are sufficiently small, the apparatus 10 may still provide room type detection as a motion event enters the detection limit 12 of an apparatus 10 at some point in time. Furthermore, although the detection limit 12 of each apparatus 10 is similar in the present example, the detection limit 12 of each apparatus 10 may be different as there may be variations between each apparatus 10. In addition, the detection limit 12 may be affected by obstacles, such as the walls of the room 100 or the door 105 as in the case of the apparatus 10-6.

Continuing with this example, it may be assumed that each of the apparatus 10-1, 10-2, 10-3, 10-4, 10-5, 10-6 in the room 100 detects motion events as a function of time as shown in FIGS. 3A, 3B, 3C, 3D, 3E, and 3F, respectively. Each of the FIGS. 3A, 3B, 3C, 3D, 3E, and 3F may represent a separate local dataset for their respective apparatus 10 which may be transmitted to the other apparatus 10 in the room. In the present example, the local dataset may include a binary value associated with a time value. In other examples, the local dataset may include additional information that may be detected, such as the speed of the motion event, location of the motion event, or the size of the moving object. The variation of the detection between each apparatus 10 shown in the FIGS. 3A, 3B, 3C, 3D, 3E, and 3F may be a result of a person moving around the room 100 and crossing the detection limit 12 of various apparatus 10. It is to be appreciated by a person of skill in the art with the benefit of this description that the overlap in the detection ranges may result in the detection of the same motion event by more than one apparatus 10. Furthermore, it is to be understood that the motion events in the room 100 is not limited to a single source. For example, the room 100 may have additional sources of motion that are detected, such as a second person that may result in the detection of motion events by multiple apparatus 10 without an overlapping detection range.

Referring to FIG. 4, a motion signature for the room 100 is generally shown. In continuing with the present example, the aggregator 30 combines the datasets represented in FIGS. 3A, 3B, 3C, 3D, 3E, and 3F to generate the motion signature shown in FIG. 4. In this example, the aggregator 30 generates a binary signature as a function of time representing when any motion events in the room 100 are detected. This motion signature may then be used to determine the room type based on known reference signatures. For example, the determination may be made using the matching engine 35 described above.

It is to be appreciated that the manner by which the aggregator 30 generates the motion signature of the room 100 is not particularly limited and that other methods are contemplated. For example, the motion signature may be a sum of all the local datasets for each apparatus 10 in the room or a normalized sum. In other examples, the datasets from different apparatus 10 may be weighted. For example, the apparatus 10 near the center of the room 100 may be provided more weight that an apparatus 10 near an edge of the room 100. In other examples, the area within the detection limit 12 of the apparatus 10 may be used to weight the dataset detected based on the proportion of area in the room 100 covered by the apparatus 10.

Referring to FIG. 5, a flowchart of an example method of determining a room type is generally shown at 500. In order to assist in the explanation of method 500, it will be assumed that method 500 may be performed with the apparatus 10. Indeed, the method 500 may be one way in which the apparatus 10 may be configured. Furthermore, the following discussion of method 500 may lead to a further understanding of the apparatus 10. In addition, it is to be emphasized, that method 500 may not be performed in the exact sequence as shown, and various blocks may be performed in parallel rather than in sequence, or in a different sequence altogether.

Beginning at block 510, a motion event is to be detected in a room by the apparatus 10 using the sensor 15. The manner by which the motion event is detected is not particularly limited. The sensor 15 may be placed in a location of the room to detect the motion event from a large area. The motion event may be detected using various techniques, such as passively monitoring signals within range of the sensor 15, such as monitoring infrared radiation emitted by warm bodies. In other examples, the motion event may be detected actively by measuring reflected signals at the sensor 15 from a emission source (not shown) within the apparatus 10.

Block 520 comprises storing data associated with the motion event detected at block 510 in a local dataset. The local dataset may be stored on the memory storage unit 20 described above. The manner by which the local dataset is generated as well as the structure of the data within the local dataset is not particularly limited. In the present example, the dataset may be structured as a table with two columns. The first column may include a binary value representing whether a motion event was detected by the sensor 15. The second column in the dataset may include a counter or time value at which the binary value in the first column is recorded. In addition, the local dataset may also include further information, such as an identifier of the apparatus 10 or the room in which the apparatus 10 is located.

In other examples, the block 520 may involve storing additional data associated with the motion event. For example, the sensor 15 may be capable of identifying the source of the motion event. The source of the motion event may be a person, an animal, or an object. The manner by which the source of the motion event is identified is not particularly limited and may involve a camera and image analysis. Alternatively, the sensor 15 may also include other identification capabilities, such as the ability to detect an RFID or Bluetooth device.

Next, block 530 comprises receiving an external dataset from an external device detecting motion events. In the present example, it is to be appreciated by a person of skill with the benefit of this description that there may be more than a single external device and that the apparatus 10 may receive datasets from multiple external devices. The external devices may be similar to the apparatus 10 and may generate a dataset similar to the dataset generated at block 520. Accordingly, in this example, the apparatus 10 may receive external datasets in substantially the same format as the local dataset.

Block 540 generates a motion signature by combining the local dataset stored during the execution of block 520 and the external dataset received at block 530. The manner by which the motion signature is generated is not limited. In the present example, the aggregator 30 combines the datasets to plot the binary detection of motion within the room 100 as a function of time. After the motion signature is generated, a determination of the room type may be made by the matching engine at block 550.

Referring to FIG. 6, a building space 200 with a plurality of rooms 210, 220, 230 and hallway 240 is shown. The building space 200 also includes a plurality of apparatus 10-1, 10-2, . . . , 10-25 deployed deployed throughout the building space 200. The building space 200 may be an office unit, a warehouse, a residential home, or any other interior space. It is to be appreciated that in the present example, the apparatus 10 may be pre-installed in the building space prior to the placement of the walls to form the rooms 210, 220, 230. Each of the apparatus 10 may be substantially identical units and unaware of the manner by which the building space 200 is subsequently divided. The apparatus 10 are generally spaced uniformly throughout the building space 200.

In the present example, it is to be appreciated that the apparatus 10 is to be grouped according to rooms prior to any determination of room type. The manner by which the apparatus 10 is grouped is not limited. For example, the apparatus 10 may be manually grouped by a building administrator or contractor. In this example, the administrator or contractor may program each apparatus 10 with an identifier associated with the room type.

In other examples, the apparatus 10 may carry out an automated detection process where each apparatus 10 communicates with other apparatus 10 to group themselves. For example, the apparatus 10 may include a line of sight communication method, such as an electromagnetic signal that cannot penetrate the wall between the rooms. The signal may include an identifier such that all the apparatus 10 in the room may be able to identify other apparatus 10 within the same room. In another example, the apparatus 10 may have a detection limit that significantly overlaps with adjacent apparatus 10 but cannot penetrate the walls. Accordingly, when a motion event is detected by an apparatus 10, the adjacent apparatus 10 is also expected to detect the motion event. If adjacent apparatus cannot detect common motion events, it may be assumed there is a wall between the two apparatus 10.

Continuing with the present example, the apparatus 10-1, the apparatus 10-2, the apparatus 10-6, and the apparatus 10-7 may be grouped together as being in the room 210. The apparatus 10-11, the apparatus 10-12, the apparatus 10-16, and the apparatus 10-17 may be grouped together as being in the room 220. The apparatus 10-4, the apparatus 10-5, the apparatus 10-9, the apparatus 10-10, the apparatus 10-14, the apparatus 10-15, the apparatus 10-19, and the apparatus 10-20 may be grouped together as being in the room 230. The apparatus 10-3, the apparatus 10-8, the apparatus 10-13, the apparatus 10-18, the apparatus 10-21, the apparatus 10-22, the apparatus 10-23, the apparatus 10-24, and the apparatus 10-25 may be grouped together as being in the hallway 240.

After the apparatus 10 are grouped with respect to their rooms, each apparatus 10 may carry out the method 500 with the apparatus 10 within their group in order to make a room determination. For example, the apparatus 10-1 may collect a local dataset and receive datasets from the apparatus 10-2, the apparatus 10-6, and the apparatus 10-7 to make a determination that the room 210 is a private office. In this example, the apparatus 10-2, the apparatus 10-6, and the apparatus 10-7 are expected to reach the same conclusion. It is to be appreciated that the room determination by each of the apparatus 10-1, the apparatus 10-2, the apparatus 10-6, and the apparatus 10-7 may be shared among themselves to carry out an optional verification step, such as through a voting process.

In a similar manner, the apparatus 10-11 may collect a local dataset and receive datasets from the apparatus 10-12, the apparatus 10-16, and the apparatus 10-17 to make a determination that the room 220 is a shared office. The apparatus 10-4 may collect a local dataset and receive datasets from the apparatus 10-5, the apparatus 10-9, the apparatus 10-10, the apparatus 10-14, the apparatus 10-15, the apparatus 10-19, and the apparatus 10-20 to make a determination that the room 230 is a conference room. In addition, any one of the apparatus 10-3, the apparatus 10-8, the apparatus 10-13, the apparatus 10-18, the apparatus 10-21, the apparatus 10-22, the apparatus 10-23, the apparatus 10-24, and the apparatus 10-25 may carry out the method 500 with each other to make the determination that hallway 240 is in fact a hallway and not a room.

It is to be appreciated that each of the apparatus 10 in the present example may carry out the method 500 at any time. In some examples, the method 500 may be carried out periodically to determine if the room type has changed. For example, the method 500 may be carried out each morning, once a week, once a month, once a year, or on demand by an administrator. By updating the room type determination periodically, it is to be appreciated by a person of skill in the art with the benefit of this description that the operating parameters may be automatically set based on the present use of the room with any manual intervention when the use of the room changes. For example, if the room 230 were to be converted from a conference room to an open concept workspace, the apparatus 10 may automatically adjust the operating parameters such as motion sensor timer values, the number and duration of transition levels between occupied and vacant light levels, dimming rates, and the range of light levels associated with the new use.

Referring to FIG. 7, another schematic representation of an apparatus to determine a room type in coordination with other devices is generally shown at 10*a*. Like components of the apparatus 10*a* bear like reference to their counterparts in the apparatus 10, except followed by the suffix "a". In the present example, the apparatus 10*a* is to collect data and to transmit and to receive data with other devices. The data from other devices may be used in combination with the collected data to make a room type determination. In the present example, the apparatus 10*a* includes a sensor 15*a*, a memory storage unit 20*a*, a communications interface 25*a*, and an aggregator 30*a*.

In the present example, the apparatus 10*a* does not include a matching engine. Accordingly, after the aggregator 30*a* combines the local dataset with the external dataset to generate a motion signature for the room, the aggregator 30*a* is to transmit the motion signature to an external server (not shown) to determine the room type. The external server to which the motion signature is to be sent may carry out an analysis on the motion signature and return the selected room type to the apparatus 10*a*.

It is to be appreciated that the apparatus 10*a* effectively shifts the matching process to an external server operating a matching engine. The external server is not limited and may be a central device on a closed network. In this example, the external server (not shown) may be part of the same system to determine a room type. Accordingly, the external server may include a memory storage unit to store a plurality of reference signatures to be used by the matching engine. In other examples, the external server may be a cloud server or other service provider specializing in matching motion signatures to room types. By offloading the matching process, which may be a computationally resource heavy process, from the apparatus 10*a*, the apparatus 10*a* may include fewer components and relatively more economical components since less computational power is to be used at the apparatus 10*a*. Furthermore, by centralizing the matching process, the maintenance and updating of reference signatures as more data becomes available as additional empirical data is collected over time.

Referring to FIG. 8, another schematic representation of an apparatus to determine a room type in coordination with other devices is generally shown at 10*b*. Like components of the apparatus 10*b* bear like reference to their counterparts in the apparatus 10, except followed by the suffix "b". In the present example, the apparatus 10*b* is to collect data and to transmit and to receive data with other devices. The data from other devices may be used in combination with the collected data to make a room type determination. In the present example, the apparatus 10*b* includes a sensor 15*b*, a memory storage unit 20*b*, a communications interface 25*b*, a light source 45*b*, and processor 50*b*. In the present example, the processor 50*b* includes components to operate the aggregator 30*b*, the matching engine 35*b*, and the controller 55*b*.

In the present example, the sensor 40*b* is to measure an ambient light level. For example, the sensor 40*b* may be a light detector such as a photodiode, a photoresistor, or a phototransistor. The sensor 40*b* is not limited and may be used to detect whether ambient light level is above or below a threshold value. In some examples, the sensor 40*b* may be used to determine when the ambient light level increases past an upper threshold and when the ambient light level decreases past a lower threshold. In other examples, the sensor 40*b* may be used to determine an absolute ambient light level.

The light source 45*b* is to illuminate a space. The light source 45*b* is not particularly limited and may be any device capable of generating light for the purposes of space lighting. For example, the light source 45*b* may be an incandescent light bulb, a fluorescent light bulb, or a light emitting diode.

The processor 50*b* may include a central processing unit (CPU), a microcontroller, a microprocessor, a processing core, a field-programmable gate array (FPGA), an application-specific integrated circuit (ASIC), or similar. The processor 50*b* may cooperate with the memory storage unit 20*b* to execute various instructions stored thereon. For example, the memory storage unit 20*b* may store an operating system that is executable by the processor 50*b* to provide general functionality to the apparatus 10*b*, including functionality to determine the room type and to control the light source 45*b* in accordance with the operating parameters of the room type. Examples of operating systems include Windows™, macOS™, iOS™, Android™, Linux™, and Unix™. The memory storage unit 20*b* may additionally store applications that are executable by the processor 50*b* to provide specific functionality to the apparatus 10, such as functionality to control various components such as the sensor 15*b*, the communications interface 25*b*, and the light source 45*b*. Functionality may include operating an interface where a use may provide instructions, such as from a wall mounted control panel. In other examples, the processor 50*b* may transmit or receive data, such as input and output over a network to an external device via the communications interface 25.

In the present example, the processor 50*b* may dedicate a portion of its resources to the aggregator 30*b* and the matching engine 35*b*. Each of the aggregator 30*b* and the matching engine 35*b* may function similarly to the aggregator 30 and the matching engine 35 described above.

The processor 50*b* may further dedicate a portion of its resources to the controller 55*b*. It is to be appreciated by a person of skill in the art with the benefit of this description that although the controller 55*b* is shown to be carried out by the processor 50*b* in this example, variations are contemplated. For example, the controller 55*b* may include a separate standalone component or be carried out on a separate processor from the processor 50*b*.

In the present example, the controller 55*b* is to control the light source 45*b*. In particular, the controller 55*b* may provide power to the light source 45*b* or turn off the light source 45*b* by cutting off power. Furthermore, in some examples, the controller 55*b* may also control the dimming of the light source 45*b* as well as dimming rates and other operating conditions. The manner by which the controller 55*b* controls the light source 45*b* is not limited and may involve implementing appropriate operating parameters based on the selected room type. In further examples, the controller 55*b* may receive data from the sensor 40*b* to control the light source 45*b* based on the ambient light level. In this case, the controller 55*b* may power on the light source 45*b* if the ambient light level is below a lower threshold and may turn off the light source 45*b* if the ambient light level is above an upper threshold. It is to be appreciated that using two separate thresholds for powering on and turning off the light source 45*b* reduces toggling between the two states when the ambient light level is near the threshold.

It should be recognized that features and aspects of the various examples provided above may be combined into further examples that also fall within the scope of the present disclosure.

What is claimed is:

1. An apparatus comprising:
a sensor to detect a motion event in a space;
a memory storage unit to store data associated with the motion event, wherein the data is to be stored in a local dataset;
a communications interface to communicate with an external device, wherein the communications interface is to transmit the local dataset to the external device and to receive an external dataset from the external device to be stored in the memory storage unit;
an aggregator in communication with the memory storage unit, wherein the aggregator is to combine the local dataset with the external dataset to generate a motion signature; and
a matching engine to select a room type based on the motion signature.

2. The apparatus of claim 1, further comprising a light source to illuminate the space.

3. The apparatus of claim 2, further comprising a controller to control the light source based on the room type.

4. The apparatus of claim 3, further comprising a light detector to measure an ambient light level, wherein the controller is to further control the light source based on the ambient light level.

5. The apparatus of claim 1, wherein the matching engine selects the room type via a comparison of the motion signature with a plurality of reference signatures.

6. The apparatus of claim 5, wherein the plurality of reference signatures is stored on the memory storage unit.

7. The apparatus of claim 5, wherein the plurality of reference signatures is stored remotely.

8. The apparatus of claim 5, wherein the matching engine assigns a similarity index between the motion signature and each reference signature of the plurality of reference signatures.

9. The apparatus of claim 8, wherein the matching engine selects the room type with a greatest similarity index.

10. The apparatus of claim 9, wherein the similarity index of the room type selected is to be above a predetermined threshold.

11. An apparatus comprising:
a sensor to detect a motion event in a space;
a memory storage unit to store data associated with the motion event from the sensor in a local dataset;
a communications interface to communicate with an external device, wherein the communications interface is to transmit the local dataset to the external device and to receive an external dataset from the external device to be stored in the memory storage unit; and
an aggregator in communication with the memory storage unit to combine the local dataset with the external dataset to generate a motion signature, wherein the aggregator is to transmit the motion signature to an external server to determine a room type based on the motion signature.

12. The apparatus of claim 11, further comprising a light source to illuminate the space.

13. The apparatus of claim 12, further comprising a controller to control the light source based on the room type.

14. The apparatus of claim 13, further comprising a light detector to measure an ambient light level, wherein the controller is to further control the light source based on the ambient light level.

15. A system comprising:
a first device to generate a first motion dataset associated with a first space;
a second device to generate a second motion dataset associated with a second space;
an aggregator in communication with the first device and the second device, the aggregator to combine the first motion dataset with the second motion dataset to generate a motion signature, wherein the motion signature is to be used to determine a room type; and
a matching engine to select the room type via a comparison of the motion signature with a plurality of reference signatures.

16. The system of claim 15, further comprising a memory storage unit to store the plurality of reference signatures.

17. The system of claim 15, wherein the matching engine assigns a similarity index between the motion signature and each reference signature of the plurality of reference signatures.

18. The system of claim 17, wherein the matching engine selects the room type with a greatest similarity index.

19. The system of claim 18, wherein the similarity index of the room type selected is to be above a predetermined threshold.

\* \* \* \* \*